United States Patent [19]

Kalman et al.

[11] Patent Number: 4,734,194

[45] Date of Patent: Mar. 29, 1988

[54] COMBINED FILTER AND VALVE MECHANISM

[75] Inventors: Andrew Kalman, Portage; Melvin C. Tyler, Schoolcraft; William E. VerMeulen, Scotts; Thomas M. Boersma, Augusta, all of Mich.

[73] Assignee: The Upjohn Company, Kalamazoo, Mich.

[21] Appl. No.: 843,941

[22] Filed: Mar. 25, 1986

[51] Int. Cl.⁴ .................. B01D 35/02; F16K 21/00
[52] U.S. Cl. ................... 210/390; 210/429; 261/64.1; 261/122; 137/547
[58] Field of Search ........... 210/390, 427, 429, 431, 210/432; 137/544, 547, 549; 261/64, 122

[56] References Cited

U.S. PATENT DOCUMENTS

| Re. 29,524 | 1/1978 | Spencer | 428/134 |
|---|---|---|---|
| 517,550 | 4/1894 | Messinger | 210/431 |
| 554,281 | 2/1896 | Linke et al. | 210/390 |
| 820,146 | 5/1906 | Simonds | 210/390 |
| 1,985,858 | 12/1934 | Gerdts | 210/429 |
| 2,001,610 | 5/1935 | Hildenbrand | 210/429 |
| 3,233,980 | 2/1966 | Fox et al. | 210/390 X |
| 4,139,585 | 2/1979 | Kirschner et al. | 251/325 |
| 4,402,214 | 9/1983 | Morgan et al. | 73/40.7 |
| 4,529,514 | 7/1985 | Gruett | 210/234 |

FOREIGN PATENT DOCUMENTS

273609  2/1965  Australia ..................... 137/547

Primary Examiner—Richard V. Fisher
Assistant Examiner—Linda S. Evans
Attorney, Agent, or Firm—Flynn, Thiel, Boutell & Tanis

[57] ABSTRACT

A combined valve and filter mechanism for use in chemical apparatus comprises a valve body having a valve seat connected thereto. A valve stem has a valve at one end thereof for engaging said valve seat and has a cylindrical filter element for telescoping within the valve seat. The mechanism permits filtration of the chemical in situ without a separate filtering mechanism while providing a valve which when open or closed permits the agitation of the chemical in the apparatus without interference with or from the valve and vice versa. In the fully open position, the entire contents of the apparatus can be withdrawn from the apparatus.

13 Claims, 7 Drawing Figures

COMBINED FILTER AND VALVE MECHANISM

FIELD OF THE INVENTION

This invention relates to a combined filter and valve mechanism especially for use in the chemical industry, for example, in association with chemical reactors, storage vessels and chemical flow lines. The combined filter and valve mechanism is constructed to replace conventional flush-mounted discharge valves for vessels containing chemicals and incorporates a self-contained filtering apparatus. The valve in the combined mechanism is called a flush-mounted valve because when the valve is closed, the upper wall of the valve is substantially flush with the bottom wall of the vessel so as to minimize dead spaces in which solid material can accumulate. An internal agitator can be located close to the bottom of the vessel to agitate the contents of the vessel or other chemical apparatus, in either the fully open or fully closed position of the valve, without interference with the valve and vice versa. The combined filter and valve mechanism can also be used for introducing gas into the vessel.

DISCUSSION OF PRIOR ART

Spencer, U.S. Pat. No. Re. 29,524, is directed to a multilayer porous laminate for use as a filter, and a method of manufacturing the same, each laminate of the filter having a slot pattern formed therein.

Messinger, U.S. Pat. No. 517,550, relates to a water faucet using a main valve and an auxiliary valve, so arranged to prevent water hammer in the water pipes.

Gerdts, U.S. Pat. No. 1,985,858, relates to a discharge valve arrangement in which a valve stem rotatably engages two valve bodies to move them to open and closed positions. The valve arrangement is used for drawing off the contents of containers or tanks on vehicles through two openings. A strainer can be placed over the inlet opening to retain any solid matter in the tank and prevent the same from interfering with the proper function of the device.

Hildenbrand, U.S. Pat. No. 2,001,610, teaches a valve means in a gas tank and a sediment trap for catching foreign matter. The sediment trap is located under the tank and a perforated cylinder forming a screen is so located that fuel from the tank must pass the screen before entering the trap. A valve element is so disposed to be seated to prevent flow to the screen and to the trap, the valve element being manually rotated by a rod introduced into the tank. A plug below the screen permits removal of the screen and the sediment therewith, permitting the screen to be cleaned.

Kirschner et al, U.S. Pat. No. 4,139,585, teaches valve structure for the introduction of gas into a container, the valve structure having a movable, hollow piston with gas jetting openings at one end and means to extend the piston into the container to expose the gas jetting openings and to provide a path for the introduction of gas into the container. The piston can be withdrawn, so that the gas jets are not exposed, stopping the flow of gas therethrough.

Morgan et al, U.S. Pat. No. 4,402,214, relates to a testing device for testing filter elements for defects using a test fluid, i.e., a smoke, having entrained foreign particles.

Gruett, U.S. Pat. No. 4,529,514, teaches using a filter in a cup-like housing. A tubular member provides in one position a flow path for a fluid to the filter, the tubular member being movable between first and second positions; in the first position communication for flow occurs from an inlet passage through the filter element to a filter chamber outlet, the tubular member being biased to the second position when the filter and its housing are removed from the system to effect a shut-off between the inlet passage and tubular member.

SUMMARY OF THE INVENTION

The combined valve and filter mechanism of this invention is adapted to be mounted on the bottom of a chemical reactor or in other apparatus usable in the chemical industry, and enables performance of filtration in the reactor or in the other apparatus, without using separate and additional filtering devices. Moreover, the reactor or other apparatus can then be used to perform washing of the filtered solids. Washing can be performed by the displacement or slurry technique, using a washing liquid that is supplied through the valve or the top of the reactor. Thus the combined valve and filter mechanism reduces capital investment by eliminating separate valves and filters. Because filtering can be performed in situ, labor costs are reduced. Because filtration is performed at the reactor or other equipment without a separate filtration system, there is no need to transport the chemicals to a reactor or other equipment for further processing, thus lessening exposure of operators to the chemical, thereby making the operation safer for the operators.

The valve itself, when used in a chemical reactor, is flush-mounted with its upper surface substantially flush with the bottom of the reactor when the valve is fully closed.

When the valve is in a first, fully closed position, the reactor outlet is closed and mixing can be performed in the reactor in the conventional way. In a second intermediate position, the valve is axially moved by means of a valve stem and is positioned so that the reactor outlet is open and a tubular filtering element is positioned between the reactor outlet and the interior of the reactor, so that the contents of the reactor are filtered as they are discharged from the reactor. Discharging of the contents from the reactor can be effected by gravity, pressure or vacuum, depending on the nature of the reactor contents. In a third, fully open position, the valve is at its extreme inward position inside the reactor and remote from the valve seat, the tubular filtering element is spaced from the valve seat and an open, spool-like frame is positioned between the reactor outlet and the contents of the reactor. Because of the open construction of the frame, the entire contents of the reactor can be discharged through the reactor outlet without being filtered. The contents of the vessel can be agitated while they are being discharged through the reactor outlet.

The valve and filter mechanism can be moved to any position between its fully closed position and its fully open position. Visible indicia can be provided to indicate the position of the valve, i.e., closed, fully open and filtering, so that the desired function can be performed with ease.

The combined valve and filter mechanism comprises a valve body provided with a port, an elongated and axially movable valve stem having a valve member mounted on one end thereof. A flanged, generally cylindrical valve seat member telescopically receives a generally cylindrical spool-like frame with a substantially fluid-tight fit. The spool-like frame is supported on a shoulder of the valve stem which passes therethrough. A generally cylindrical filter element is connected between the end of the frame that is remote from the supporting shoulder and the valve. The filter element is preferably a surface type filtration element constructed of multiple layers of metal mesh, so as to retain solids on the outer surface thereof. The filter element has substantially the same diameter as that of the spool-like frame, so that it also telescopes into the valve seat when the valve is closed and has a substantially fluid tight fit therewith when the valve is in its filtering position.

The port of the valve body can be connected to a suitable receptacle or to a pipe to receive the contents of the reactor. A source of vacuum connected at the port or pressurized gas introduced into the reactor can be used to assist in discharging the contents of the reactor.

In another embodiment of the invention, the valve body port is connected to a source of pressurized gas, so that the device acts as a sparger to direct bubbles or jets of the gas into the reactor to which the combined valve and filter mechanism is connected.

DETAILED DESCRIPTION OF THE PREFERRED EMBODIMENTS

The presently preferred embodiment of the valve and filter mechanism of the invention was developed to replace the flush-mounted discharge valve at the bottom of a chemical reactor and the following description will proceed primarily with reference thereto. It is to be understood, however, that the valve and filter mechanism can be used on different kinds of vessels and in flow lines, when a combined valving and filtering function is desired.

FIGS. 1, 1A, 1B, 2 and 3, show a combined filter and valve mechanism 10 connected to the bottom of a chemical reactor 12. The combined valve and filter mechanism comprises a valve body 14 having a main body portion 16 and a guide part 18 connected to the main body portion 16 by means of bolts 20. The portion 16 has wall means defining a central internal chamber 21 and a flanged lateral port 22 for the passage therethrough of the contents of the reactor or pressurized fluid, as the case may be. The flange 24 of the port 22 can be connected to a pipe for transporting the contents of the reactor for further processing or to another receptacle (not shown). A vacuum line (not shown) can be connected to port 22 when necessary and/or desirable to assist in withdrawing the contents from the reactor. In the illustrated embodiment, a generally cylindrical spacer 26 having outwardly extending end flanges 28 and 30 is connected at one end to the main body portion 16 by means of a pipe flange 32 and bolts 34. A gasket 36 is interposed between the main body portion 16 and the spacer flange 28 to ensure a fluid-tight connection. The spacer 26 can be made integral with the main body portion 16, if desired. The other end of the spacer 26 is connected to a flange 38 of the reactor 12 by an annular pipe flange 39 and bolts 40. A generally cylindrical valve seat member 42 has an annular laterally extending flange 43 which is located between and sealed with respect to the reactor flange 38 and the flange 30 of the spacer 26. A gasket 44 is positioned between the valve seat member 42 and the flange 30 to insure a fluid-tight connection therebetween.

Figures 1, 2, 3:
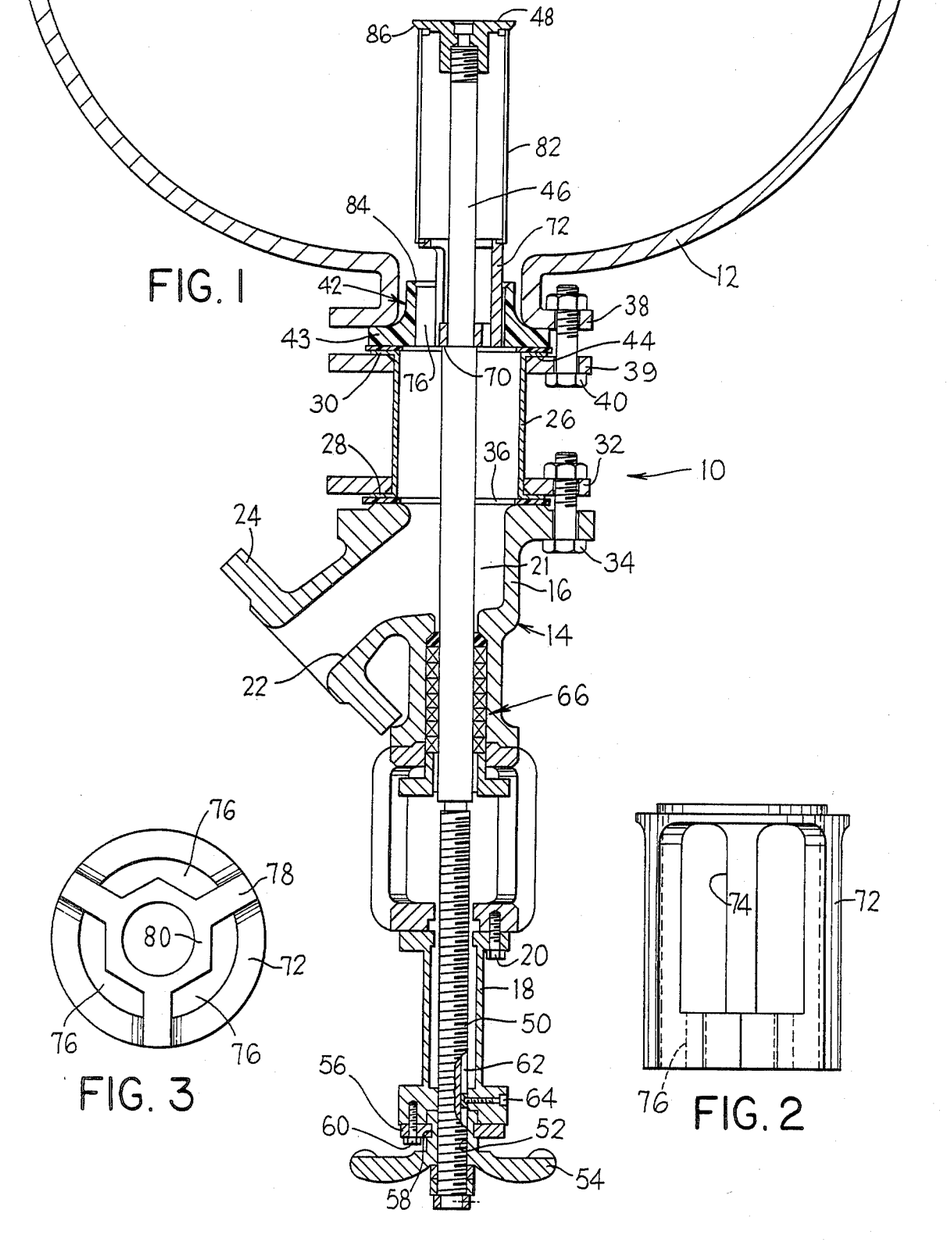
FIG. 1 is a partial sectional view through a combined valve and filter mechanism, constructed according to this invention, connected to the bottom of a chemical reactor with the valve shown in its full open position.
FIG. 2 is a side view of the spool-like frame usable in the mechanism shown in FIG. 1.
FIG. 3 is a bottom view of the frame of FIG. 2.
Figure 1A:
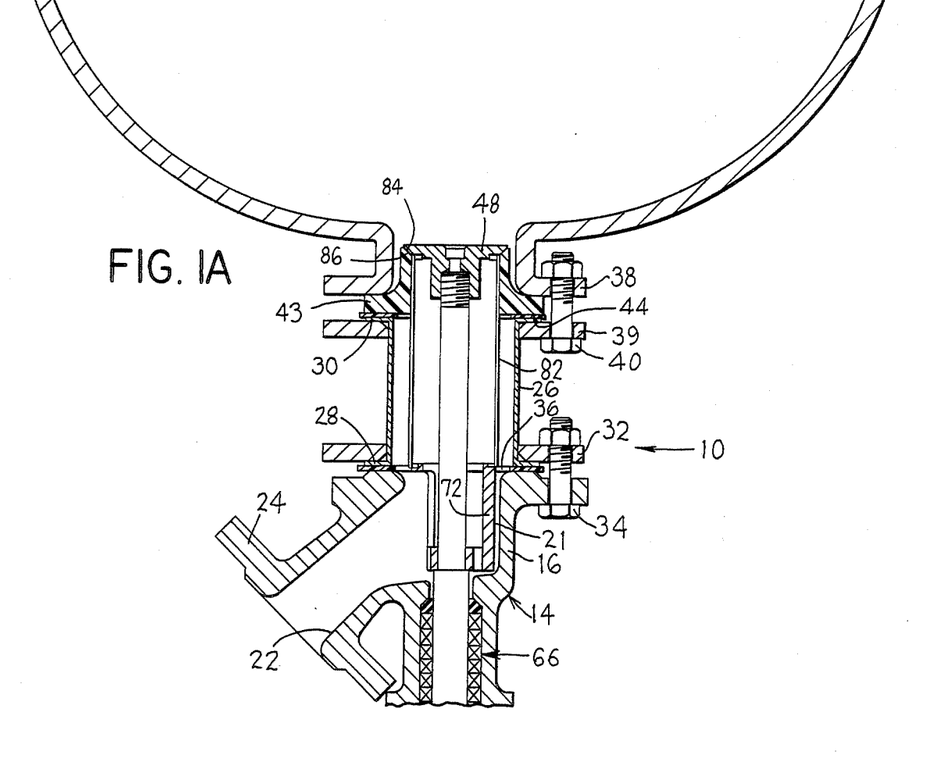
FIG. 1A is a partial sectional view similar to FIG. 1, showing the valve in its fully closed position.
Figure 1B:
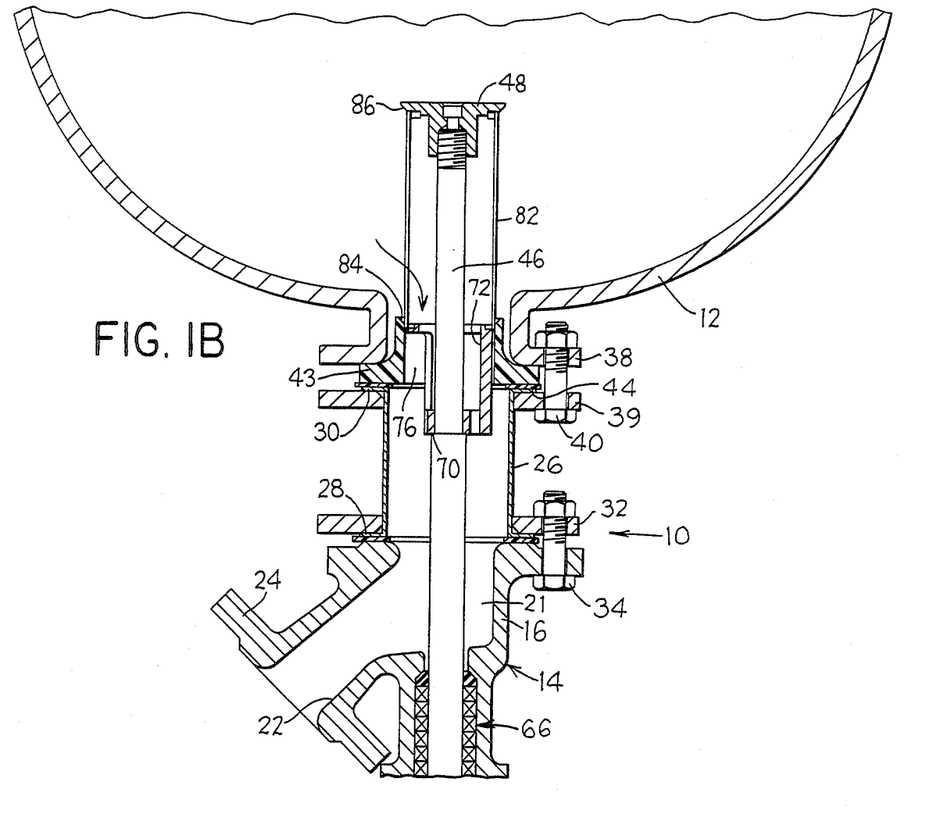
FIG. 1B is a partial sectional view similar to FIG. 1, showing the valve in its filtration position.

An elongated valve stem 46 extends axially through the guide part 18, the main body portion 16, and the spacer 26, and has a poppet-type valve 48 threadably mounted on its terminal end (inside the reactor 12). The opposite end of the stem 46 is provided with an external screw thread 50 which meshes with an internal screw thread 52 in a rotatable operating handle 54. The handle 54 is rotatably connected to the guide 18 by means of a partly annular washer 56 received in a groove 58 in the handle 54, and one or more bolts 60. To prevent the rotation of the stem 46 while permitting axial movement thereof, the stem 46 is provided with an axially extending slot 62 which receives a guide screw 64 supported by the guide 18. A compression packing and packing gland 66 surrounds the stem 46 to prevent the flow of fluid along the stem from the cavity 21 defined by the valve body 14.

The stem 46 is formed with a shoulder 70 which supports a spool-like frame 72 (see also FIGS. 2 and 3). The spool-like frame 72 has an outer diameter substantially the same as the inner diameter of the valve seat member 42, so as to be axially slidably movable therethrough and to provide a substantially fluid tight seal therewith when the parts are closely adjacent to one another. Because the valve seat member 42 is preferably constructed of polytetrafluoroethylene which has low friction properties, the fit between the frame 72 and the seat member 42 can be very close while permitting the relative axial movement therebetween. If necessary, one or more O-rings (not shown) can be provided between the frame 72 and the valve seat member 42 to improve the fluid-tightness of the structure. The frame 72 functions as an egress means and is constructed with a plurality of axially elongated openings 74 and a plurality of axially directed passages 76 through which the contents of the reactor can flow when the valve is fully open, as shown in FIG. 1, or when a portion of the frame 72 is exposed inside the reactor. The passages 76 also permit the flow of filtrate when the valve is in its filtering position as explained hereafter. The passages 76 are defined by supporting ribs 78 extending from a central hub 80 which surrounds the valve stem 46 and rests on the shoulder 70.

Figures 4, 5:
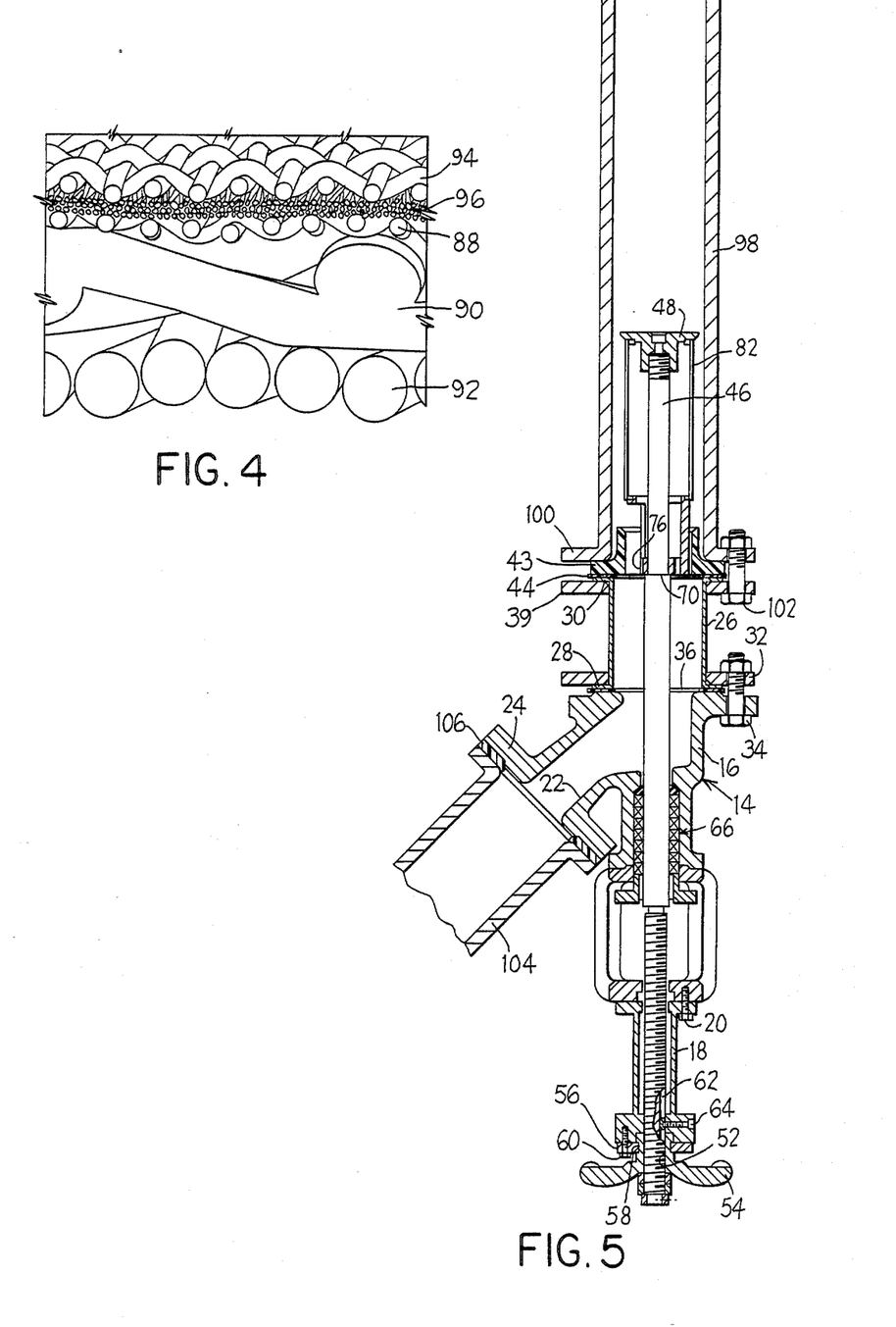
FIG. 4 is a partial sectional view through a typical tubular filter element usable in the combined valve and filter mechanism of this invention.
FIG. 5 is a partial sectional view of a second embodiment of the invention, taken through the combined valve and filter mechanism when used in a chemical apparatus pipe line.

A tubular filter element 82 is connected at one end to the frame 72 and at its other end to the valve 48. The filter element 82 is preferably of the surface filtration type wherein filtered solids are retained on the surface of the filter element and cannot penetrate the filter element. When filtering (FIG. 1B), the contents of the reactor flow therethrough (and through the passages 76 to the cavity 21 and through the port 22). Solids are retained on the surface of the filter element 82 and in the reactor. FIG. 4 illustrates one form of a suitable filter element which is a porous metal structure comprising a protective layer 94, a particle size control layer 96, a distribution layer 88, a supporting layer 90 and a coarse mesh 92. Tubular type filtering elements of this construction are commercially available under the designations POROPLATE filter elements, from Facet Corporation, Greensboro, North Carolina, and FUJIPLATE filter elements, from Fuji Filter Manufacturing Co., Ltd., Tokyo, Japan. Other types of filtering elements can be used without departing from the invention. Like the frame 72, the filter element 82 has an outside diameter substantially the same as the inner diameter of the valve seat member 42, so as to provide a generally fluid-tight seal therewith when the filter element is positioned closely adjacent to the valve seat 42, and is telescopically received in the valve seat 42 (FIG. 1A).

The valve seat element 42 presents an upwardly flaring upper edge surface 84 on which the valve surface 86 seats when the valve 48 is closed, as illustrated in FIG. 1A. In the fully open valve position illustrated in FIG. 1, all fluid and the solids in the reactor can flow through the openings 74 and the passages 76 in the frame 72 to and through the port 22; in the closed valve position shown in FIG. 1A, nothing can flow from the reactor; in the partly open position as shown in FIG. 1B, only filtrate flows from the reactor through the passages 76 to and through the port 22, any solids remaining on the surface of the filter element 82. While the valve 48 can be axially moved to any position between closed and fully open, indicia is usually provided on the stem or at some location closely adjacent thereto to indicate the position of the stem and thus the valve, making it possible to select the desired position of the valve. It is possible to use a remotely controlled apparatus to rotate the handle.

FIG. 5, in which like reference characters refer to like parts in FIGS. 1, 1A and 1B, illustrates the invention when used as an in-line valve and filter in a chemical flow line 98. The line 98 has a flange 100 which is connected to the flange 30 of the spacer 26 by bolt means 102 and the annular pipe flange 39. The valve seat 42 is positioned with its flange 43 between the flanges 30 and 100. Here, a pipe 104 is connected to the flange 24 of the port 22 and is sealed thereto by a gasket 106. The frame, filter and valve are positioned relative to the valve seat in the same manner as before described, except that the combined filter and valve mechanism is connected into the chemical flow line 98. The combined valve and filter mechanism functions as an in-line system in the pipe line.

The foregoing description has referred to the operation in which the mechanism is used as a valve and filter and the filtrate is removed through the port 22. In a modification, the port 22 can be connected to a source of pressurized fluid so that the fluid can be injected into the vessel or pipeline. For example, a pressurized gas can be injected in the form of jets or bubbles into the reactor when the valve and filter mechanism is in its FIG. 1B position. Moreover, the filter 82 can be backflushed by flowing a pressurized liquid from the port 22 through the filter 82 into the vessel. The backflushed solids that collect in the bottom of the vessel can thereafter be discharged by fully opening the valve. Thus, at the end of an operation and after the filtrate has been removed, the filter 82 can be backflushed and cleaned and the solids can then be removed through the port 22.

In other types of operations, for example, a washing operation, the solids can be retained in the vessel and a fresh supply of liquid introduced into the vessel for further treatment of the solids; for example, for washing a precipitate.

The appended claims are intended to cover all equivalents of the apparatus and are to be interpreted as broadly as the prior art will permit.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A combined valve and filter mechanism for use in a chemical apparatus in which the valve is an outside screwtype and (a) when closed, is substantially level with the bottom of the apparatus thus permitting the use of agitating means in the apparatus without interference with said valve and filter mechanism; (b) when partly open with only the filter exposed to the interior of the apparatus, permitting the fluid contents of the apparatus to be withdrawn through the filter; and (c) when fully open, permitting the entire contents of the apparatus to be freely withdrawn from the apparatus, said combined valve and filter mechanism comprising:

a valve body;

means defining a port in said valve body for the withdrawal therethrough of fluid from said apparatus;

a valve stem;

a valve connected to one end of said valve stem;

a valve seat connected to said valve body, said valve seat comprising a generally cylindrical member;

a cylindrical filter connected to said valve and being of such configuration to telescope with respect to said valve seat in fluid-tight relationship at certain positions of said valve;

a generally cylindrical frame member having a plurality of means defining passages therethrough, said frame member being connected at one end to said filter and being axially movably supported at the other end by said valve stem, said frame member being of such configuration to telescope with respect to said valve seat in substantially fluid-tight relationship when adjacent thereto; and an operating handle rotatably supported on said valve body and threadably receiving the other end of said valve stem, whereby rotaton of said handle causes axial movement of said valve stem in said body to thus seat and/or unseat said valve on said valve seat and to move said valve and its connected filter and frame member to positions therebetween.

2. The mechanism as recited in claim 1, wherein said valve body comprises a first body portion and further comprising a generally cylindrical spacer element connected to said first body portion, said valve seat being directly connected to said spacer element.

3. The mechanism as recited in claim 1, wherein said filter comprises a metal, multi-layer, porous, surface filtration type element to retain solids on the surface thereof.

4. The mechanism as recited in claim 1, further comprising means defining a source of pressurized gas connected to said means defining a port, in order to permit the introduction of said gas into said chemical apparatus when said valve is unseated from said valve seat to thus function as a sparger.

5. A combined filter and valve mechanism adapted to be mounted in a chemical apparatus comprising:
- a valve;
- a valve body with means defining a port therein;
- a generally cylindrical spacer member connected to one end of said valve body;
- a flanged cylindrical valve seat member abutting and connected to the other end of said spacer member and defining a valve seat;
- a cylindrical spool-like frame member slidably received in said valve seat member;
- a cylindrical filter connected to said frame member and to said valve;
- a valve handle rotatably supported by said valve body; and
- a valve stem connected at one end to said valve and threadably received in said valve handle, said valve stem supporting said frame member and said filter;
- whereby upon rotation of said valve handle, said valve is moved between a valve seated position and a valve fully open position, the positions of said valve, said filter and said spool being selectable to (a) retain the contents of said apparatus therein; (b) filter and withdraw filtrate from said apparatus through said means defining a port; and (c) withdraw freely the contents of said apparatus through said means defining a port.

6. The mechanism as recited in claim 5, wherein said filter comprises a metal, multi-layer, porous, surface filtration type element to retain solids on the surface thereof.

7. A combined valve and filter mechanism comprising:
- a valve body means;
- a valve member;
- a valve seat member having an annular surface defining a valve seat and means defining a cylindrical opening therethrough;
- a cylindrical filter element connected at one end to said valve member and slidably received in said means defining a cylindrical opening with a generally fluid-tight fit;
- means to move said valve member between an open position wherein said valve member is spaced from said valve seat and said filter element is exposed and a closed position wherein said filter element slides within said means defining a cylindrical opening;
- a generally cylindrical frame member having a plurality of means defining passages therethrough positioned between said filter element and said means to move said valve member, said valve member being movable to a position wherein said frame member slides within said means defining a cylindrical opening and is positioned in fluid-tight relationship therewith; and
- said means to move said valve member being supported in said valve body means and supporting the other end of said filter element.

8. A combined filter and valve mechanism adapted to be mounted in means defining an opening in a wall of a vessel so that when the valve is closed, the inner surface of said mechanism is substantially flush with said wall of the vessel; comprising:
- an elongated valve body having means defining an internal chamber opening through the inner longitudinal end thereof and means defining a discharge port extending from said chamber;
- a valve seat member connected to the inner longitudinal end of said valve body and coaxial therewith, said valve seat member extending in an inner longitudinal direction with respect to said valve body and having an inner wall comprising means defining a central opening and a valve seat at the inner longitudinal end of said means defining a central opening;
- a valve stem extending coaxially through said valve body and said valve seat member, said valve stem being spaced from the inner wall of said valve seat member and defining therewith means defining a passageway which is open at its outer longitudinal end, said outer longitudinal end of said means defining a passageway communicating with said internal chamber of said valve body and thence with said means defining a discharge port, the inner longitudinal end of said means defining a passageway being defined by said valve seat;
- means connected to said valve stem for moving same axially with respect to said valve body and said valve seat member and at a right angle to the plane of said valve seat;
- a valve mounted on the inner longitudinal end of said valve stem for axial movement therewith, said valve being of larger size than said valve seat member, said valve having a valve surface which is sealingly engageable with said valve seat when said valve stem is in its longitudinally outermost position whereby to provide a positive fluid-tight seal at the inner longitudinal end of said valve seat member;
- a filter extending in the outer longitudinal direction away from said valve, said filter being coaxial with said valve seat member and being of substantially the same size and shape as the means defining a central opening thereof so that it is closely slidably received in said means defining a central opening thereof with a substantially fluid-tight fit, said filter being outwardly spaced from said valve stem and defining therewith means defining a filtrate-receiving chamber which is closed at its inner longitudinal end by said valve and is open at its outer longitudinal end of communication with said means defining a passageway and said means defining a chamber so that when said valve stem is moved longitudinally inwardly to move said valve away from said valve seat to an intermediate position, the contents of the vessel will contact the filter so that a filtrate will flow into said means defining a filtrate-receiving chamber and thence to said means defining a discharge port; and
- egress means separate from said filter for allowing the egress of the contents of the vessel, whereby said egress means functions as the main means for egress for the contents of the vessel when the valve is in the fully-opened position, said filter functions as the only means of egress for the contents of the vessel when the valve is in an intermediate position and when said valve is in the fully-closed position, said egress means and said filter do not contact the contents of the vessel.

9. A combined filter and valve mechanism as claimed in claim 8, wherein said egress means is a spool-like frame of substantially the same size and shape as said filter and extending longitudinally outwardly from the outer longitudinal end of said filter and coaxial therewith, said frame having means defining openings in a radially outer wall thereof and extending through the outer longitudinal end thereof so that the contents of the vessel can be discharged when said valve stem is in its longitudinally innermost position in the vessel.

10. A combined filter and valve mechanism adapted to be mounted in means defining an opening in a wall of a vessel so that when the valve is closed, the inner surface of the mechanism is substantially flush with said wall of the vessel, comprising:

an elongated valve body having means defining an internal chamber opening through the inner longitudinal end thereof and means defining a discharge port extending laterally from said means defining an internal chamber between the longitudinally inner and outer ends of said valve body;

a flanged cylindrical valve seat member connected to the inner longitudinal end of said valve body and coaxial therewith, said valve seat member extending in an inner longitudinal direction with respect to said valve body and having a flaring valve seat surface at the inner longitudinal end thereof remote from said valve body, said flaring valve seat surface defining an inwardly facing annular valve seat;

a valve stem extending coaxially through said valve body and said valve seat member, said valve stem being radially inwardly spaced from the radially inner wall of said valve seat member and defining therewith means defining a passageway of annular cross-section which is open at its outer longitudinal end, said outer longitudinal end of said means defining a passageway communicating with said means defining an internal chamber and thence with said means defining a port, the inner longitudinal end of said means defining a passageway being defined by said annular valve seat;

means connected to said valve stem for moving same axially with respect to said valve body and said valve seat member and at a right angle to the plane of said annular valve seat;

a poppet valve disk mounted on the inner longitudinal end of said valve stem for axial movement thereith, said poppet valve disk being of larger diameter than the internal diameter of said cylindrical valve seat member, said poppet valve disk having a flaring valve surface which is sealingly engageable with said flaring valve seat surface when said valve stem is in its longitudinally outermost position whereby to provide a positive fluid-tight seal at the inner longitudinal end of said valve seat member;

a cylindrical foraminous filter extending in the outer longitudinal direction away from said poppet valve disk, said cylindrical filter being coaxial with said cylindrical valve seat member and being of substantially the same diameter as the means defining a central opening thereof so that said filter is closely slidably received in said means defining a central opening of said valve seat member with a substantially fluid-tight fit, said cylindrical filter being radially outwardly spaced from said valve stem and defining therewith means defining an annular filtrate-receiving chamber which is closed at its inner longitudinal end by said poppet valve disk and is open at its outer longitudinal end for communication with said means defining a passageway so that when said valve stem is moved longitudinally inwardly to move said poppet valve disk away from said valve seat, the contents of the vessel will contact the filter so that a filtrate will flow into said means defining a filtrate-receiving chamber and thence to said means defining a port; and egress means separate from said filter for allowing the egress of the contents of the vessel, whereby said egress means functions as the main means for egress for the contents of the vessel when the valve is in the fully-opened position, said filter functions as the only means of egress for the contents of the vessel when the valve is in an intermediate position and when said valve is in the fully-closed position, said egress means and said filter do not contact the contents of the vessel.

11. A combined filter and valve mechanism as claimed in claim 10, wherein said egress means is a cylindrical spool-like frame of substantially the same diameter as said cylindrical filter and extending longitudinally outwardly from the outer longitudinal end of said filter and coaxial therewith, said frame having means defining axially elongated openings in the radially outer wall thereof and having means defining axially directed passages extending from said means defining axially elongated openings through the outer longitudinal end thereof so that the contents of the vessel can be discharged when the stem is in its longitudinally innermost position in the vessel.

12. A combined filter and valve mechanism as claimed in claim 10, including a cylindrical spacer connected between and closing the space between the outer longitudinal end of said cylindrical valve seat member and the inner longitudinal end of said valve body.

13. A combined valve and filter mechanism comprising:

a valve body having means defining a discharge port;

a valve member;

a valve seat member having a surface defining a valve seat and means defining an opening therethrough, said valve seat member being connected to said valve body with there being means defining an open internal passageway connecting said means defining an opening to said means defining a discharge port, said valve member being adapted to sealingly engage said valve seat to close one axial end of said means defining an opening and thereby block said means defining an open internal passageway;

a foraminous filter element connected to one axial end to said valve member and being slidably received in said means defining an opening with a generally fluid-tight fit, said filter element being open at its other axial end and communicating with said means defining an open internal passageway so that filtrate is free to flow from within said filter element through said means defining an open internal passageway to said means defining a discharge port when said filter element projects outwardly from said valve seat;

means to move said valve member between an open position wherein said valve member is spaced from said valve seat and said filter element is exposed and a closed position wherein said valve member sealingly engages said valve seat and said filter element is slidably received within said means defining an opening; and egress means separate from said filter for allowing the egress of the contents of the vessel, whereby said egress means functions as the main means for egress for the contents of the vessel when the valve is in the fully-opened position, said filter functions as the only means of egress for the contents of the vessel when the valve is in an intermediate position and when said valve is in the fully-closed position, said egress means and said filter do not contact the contents of the vessel.

* * * * *

UNITED STATES PATENT AND TRADEMARK OFFICE
CERTIFICATE OF CORRECTION

PATENT NO. : 4 734 194
DATED : March 29, 1988
INVENTOR(S) : Andrew KALMAN

It is certified that error appears in the above-identified patent and that said Letters Patent is hereby corrected as shown below:

Column 7, Line 66; Change "vessel;" to ---vessel,---.

Column 8, Line 46; Change "of" to ---for---.

Column 9, Lines 43 and 44; Change "thereith" to ---therewith---.

Column 10, Line 48; Change "to" to ---at---.

Signed and Sealed this

Eleventh Day of October, 1988

Attest:

DONALD J. QUIGG

Attesting Officer

Commissioner of Patents and Trademarks